United States Patent [19]

Dos Reis et al.

[11] Patent Number: 5,642,965
[45] Date of Patent: Jul. 1, 1997

[54] INTERFACE SYSTEM FOR OPERATION OF REMOTE CONTROL VEHICLE

[75] Inventors: Ney Robinson Salvi Dos Reis; Carlos Henrique Guimaraes Da Cunha, both of Rio, Brazil

[73] Assignee: Petroleo Brasileiro S.A.- Petrobras, Rio de Janeiro, Brazil

[21] Appl. No.: 288,782

[22] Filed: Aug. 12, 1994

[30] Foreign Application Priority Data

Aug. 12, 1993 [BR] Brazil ...................................... 9303365

[51] Int. Cl.⁶ ...................................................... B63C 11/10
[52] U.S. Cl. .......................... 405/191; 74/89.15; 166/356; 405/188; 405/190; 464/52; 464/53
[58] Field of Search .................................... 405/188, 191, 405/189, 142; 166/356, 338, 358, 339; 74/500.5, 89.15; 464/52, 53

[56] References Cited

U.S. PATENT DOCUMENTS

| 2,319,409 | 5/1943 | Latimer | 464/53 X |
|---|---|---|---|
| 3,307,627 | 3/1967 | Shatto . | |
| 3,518,844 | 7/1970 | Robbins | 64/4 |
| 3,610,056 | 10/1971 | Bartholomew | 464/52 X |
| 4,034,568 | 7/1977 | Mason | 405/188 X |
| 4,094,159 | 6/1978 | Hettinger | 405/188 |
| 4,098,088 | 7/1978 | Mason | 405/188 |
| 4,109,601 | 8/1978 | Ronnevig | 405/188 X |
| 4,132,089 | 1/1979 | Skinner et al. | 464/52 X |
| 4,355,925 | 10/1982 | Rognoni . | |
| 4,355,926 | 10/1982 | Rognoni . | |
| 4,389,034 | 6/1983 | Suttles . | |
| 4,643,616 | 2/1987 | Castel et al. | 166/388 X |
| 4,989,323 | 2/1991 | Casper et al. | 464/52 X |
| 5,199,320 | 4/1993 | Spease et al. . | |

FOREIGN PATENT DOCUMENTS

WO93/01438 1/1993 WIPO ................................ 405/259.5

*Primary Examiner*—Dennis L. Taylor
*Attorney, Agent, or Firm*—Sughrue, Mion, Zinn, Macpeak & Seas

[57] ABSTRACT

All points at which torque is usually applied to subsea equipment, particularly in the search for and production of oil, are centralized at a single panel upon which standard kinds of connecting terminals fitted with sockets are clearly marked and corresponding to torque working points, in order to make access easier by remote operated vehicles.

Individual connection between applying points and the sockets on the panel is achieved by means of flexible devices.

6 Claims, 4 Drawing Sheets

INTERFACE SYSTEM FOR OPERATION OF REMOTE CONTROL VEHICLE

FIELD OF INVENTION

This invention is intended to provide a system that will enable centralization of all the points at which torque is usually applied to under water equipment to take place at one spot only, particularly as regards the equipment meant for oil prospecting and production.

BACKGROUND OF THE INVENTION

This invention is of a system that will centralize all the points at which torque is applied to under water equipment, particularly that employed in oil prospecting and oil production. Each of the points at which torque is applied is connected to the part concerned by means of a flexible device meant to transfer such torque.

PRIOR ART

With oil exploration in ever deeper waters and since techniques cannot cope in such depths new ones had to be developed in lieu of the work of divers.

An example is the span supporting system for rigid under water pipelines carrying the oil and gas produced. Such under water pipelines have to be supported whenever any free span arising out of the unevenness of the sea bed is greater than that allowed for under the design.

The kind of conventional supporting used up to recently has had limited use because divers have had to be employed to do the work, as for example when torque had to be applied at determinate points to raise the sliding of supporting devices for rigid pipelines. In order to be able to support rigid pipelines at depths beyond those at which divers can work new techniques were developed that did not require the work of divers.

One of the solutions currently employed is to lower hydraulic units together with the mechanical rigid pipeline supports to the sea bed. Such hydraulic units provide the hydraulic power for the hydraulic motors installed close to the points where torque is to be applied, which motors produce the torque required at each such point thereby enabling the entire arrangement to go into action.

It is a solution fraught with several disadvantages, such as the high cost of the hydraulic units, of the hydraulic motors, of the connections and of the umbilicals that have to feed the hydraulic unit from the supporting vessel at the surface down to the bottom of the sea, and additionally problems brought about by a under water system operating at high pressures.

Another solution also currently employed is to use remote controlled vehicles. Upon development of technology for the use of such remote controlled vehicles for jobs which until then had been done by divers, greater use of the various kinds of equipment needed to produce oil and gas at depths quite a lot greater than before became feasible and relatively cheaper.

However, because of the complex type of geometry usually to be met with in the equipment of the various sorts of under water systems employed in the search for and production of oil and gas there is always the risk of a remote controlled vehicle becoming trapped in the course of its under water work, as for instance when torque has to be applied at points difficult to reach. Another drawback to consider is the delay incurred by the remote controlled vehicle when torque has to be applied at such points of dificult access, which may even render a job impracticable because of the high cost involved.

SUMMARY OF INVENTION

This invention is meant to provide a system of interfaces for operation of remotely controlled vehicles. All the usual points for the application of torque in under water equipment are transferred to a panel at which terminals for the connection of torque applying tools for remotely operated vehicles are standardized.

Torque applying points are so placed as to enable jobs to be done with greater speed and safety, thereby length of time in use of a remotely controlled vehicle and risk of it being trapped and being damaged is less, in addition to allowing use to be made of various other kinds of means, as for instances divers hand-operated tools.

BRIEF DESCRIPTION OF THE DRAWINGS

Purposes, features and advantages of this invention will be better perceived with the aid of the following detailed description and of the drawings attached hereto, whereof.

DETAILED DESCRIPTION OF INVENTION

In order to better understand the invention the supporting system for rigid under water pipelines previously referred to will be described, thereby clearly showing advantages to be derived from the invention.

Figure 1:
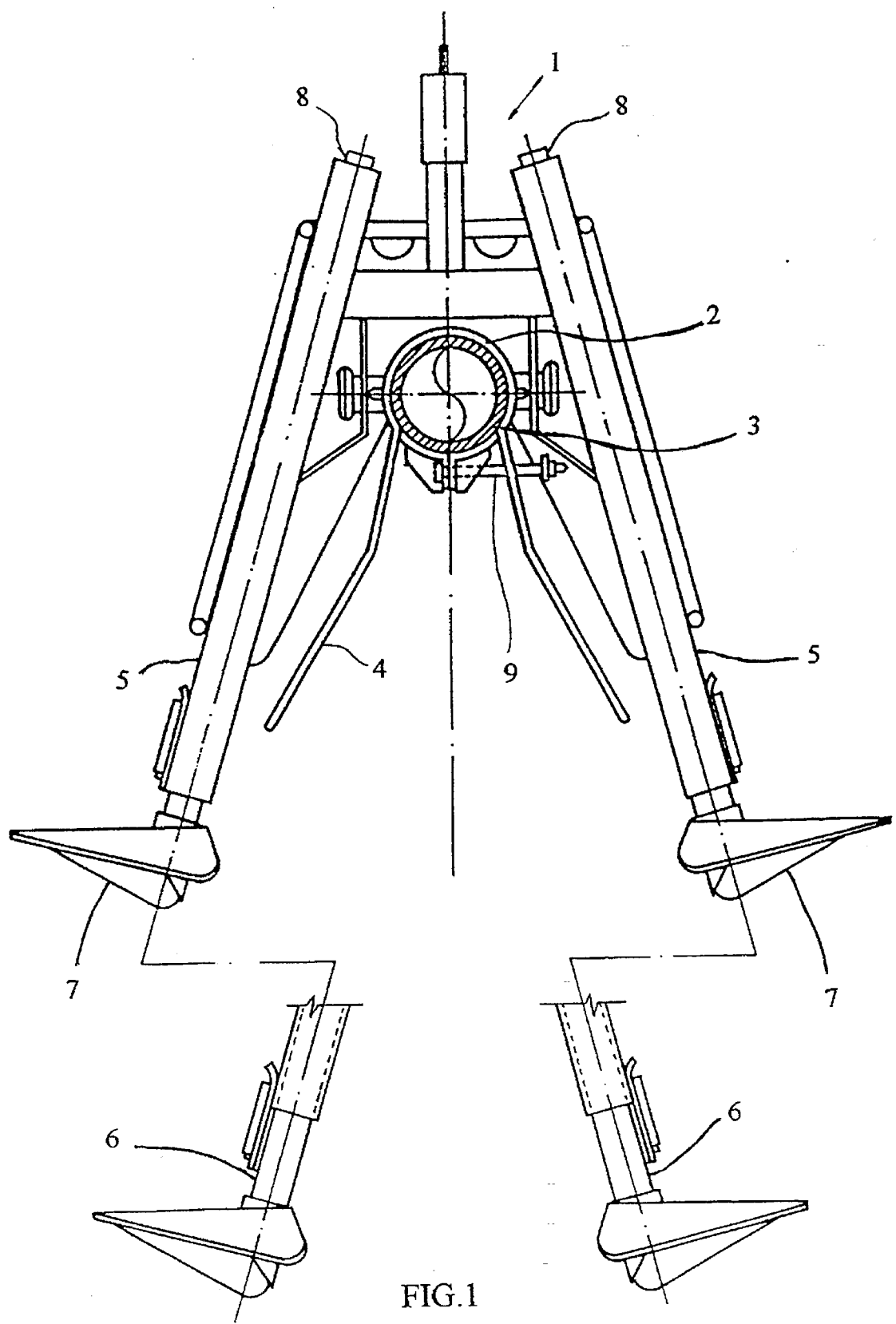
FIG. 1 is a front view of a mechanical support for subsea pipelines showing sliding legs in both retracted and extended positions.

As is to be seen from FIG. 1 the usual kind of mechanical support for under water pipelines consists basically of a structure, 1, and a pipeline fixing system, 2, to which pipeline, 3, is a fixed by means of clamps, 4. The assembly is also made up of fixed outer legs, 5, sliding lower legs, 6, and shoes, 7, the sliding lower legs, 6, being worked by screws, 8, and clamps, 4, being worked by screws, 9, working of screws 8 and 9 being done in the usual way by the remotely operated vehicle.

Figure 2:
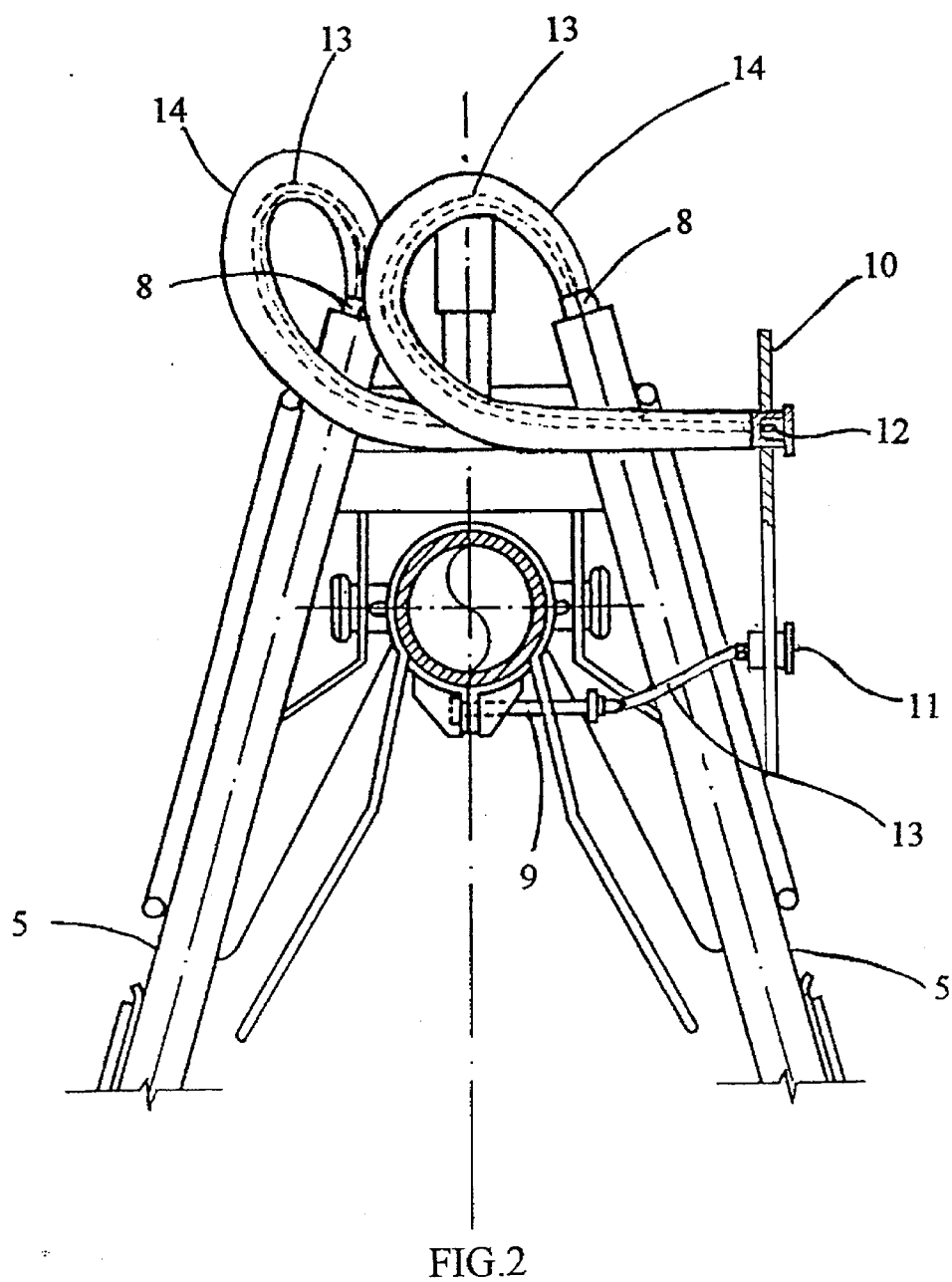
FIG. 2 is a front view of a mechanical support for under water pipelines with an interface panel to work a remotely operated vehicle.

In order to make it easier for the remotely operated vehicle to get at torque applying screws 8 and 9, to which access is difficult, as is to be seen from FIG. 2, the invention allows for the transfer of torque applying points to a panel, 10, on which there are standard connecting terminals, 11, provided with sockets, 12, which terminals lie apart from one another and are clearly marked according to the torque working points in order to make access of remotely operated vehicle easier.

Figure 3:
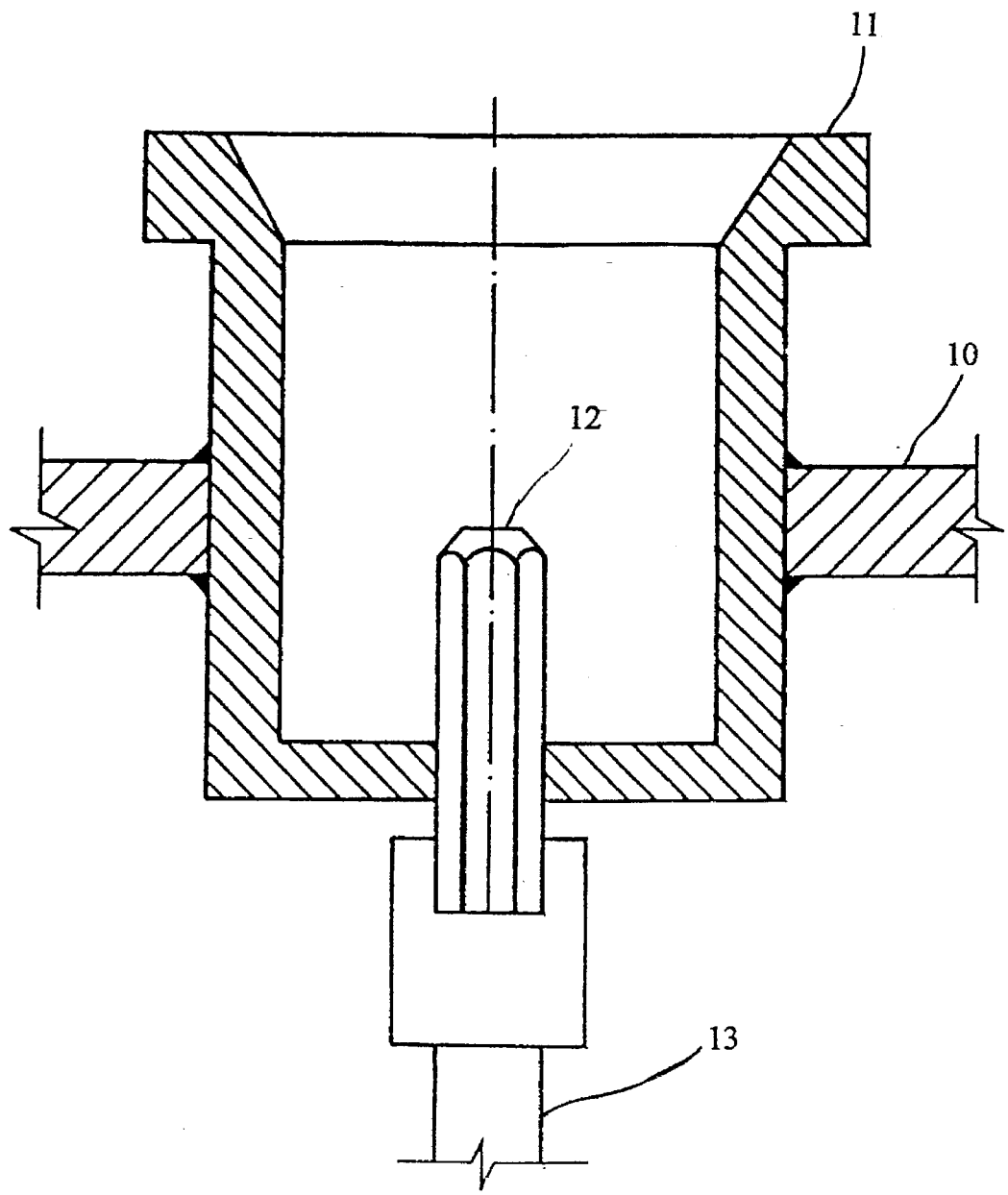
FIG. 3 is a cross-section view of a terminal assembled on the panel.

As is to be seen from FIG. 3, sockets, 12, are anchored by their ends facing the rear side of the panel, to flexible devices that can convey torque, which devices travel towards torque applying points, 8 and 9, so as to individually link terminal, 11, to torque applying points, 8 and 9. In the embodiment concerned the flexible devices shown to convey torque are non-twisting steel cables, 13. Whenever possible such steel cables, 13, should run inside conduits, 14, to prevent them from becoming wound.

Figure 4:
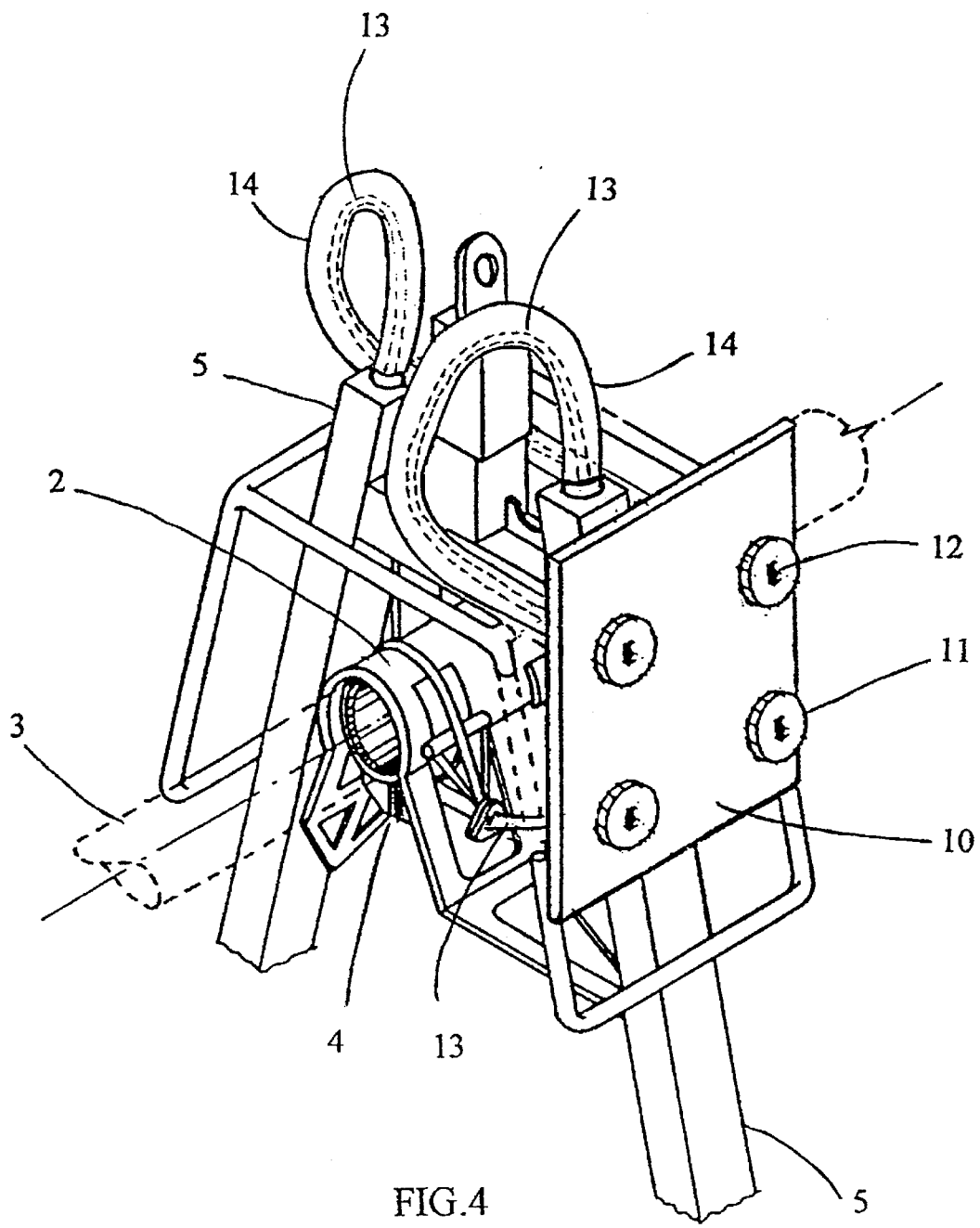
FIG. 4 is a perspective view of connections between the panel and points where torque is applied.

FIG. 4 is a sketch of the invention showing transfer from torque applying points, 11, to panel, 10 thereby enabling the remotely operated vehicle to work without any repositioning, and doing away with the risk of vehicle becoming trapped. In order to make the drawing easier to understand only the main parts of the system have been shown. Another advantage is that working of sockets need not be done only by the tool for such purpose belonging to the remotely operated vehicle, but can also be worked by various other kinds of devices, such as by a hydraulically-operated wet Xmas tree tool, by the jaw of most handling claws of remotely operated vehicles, or by divers, thereby enhancing the operational flexibility of such equipment.

It will be understood by those engaged in this technology that use of an interface system for remotely operated vehicles is not only for the rigid pipeline supports referred to above but can also be employed for any other type of equipment, whether under water or not, whenever torque has to be applied at determinated points, or whenever it is desired to centralize the torque applying points in order to optimize use of a remotely operated vehicle or any other kind of operating system.

We claim:

1. A interface system for deep sea equipment having torque application points spaced a part, comprising; at least one panel (10) having terminals (11) fitted with releasable connectors (12) mounted on said panel, said connectors (12) being individually connected by a flexible torque-transmitting drive (13) to the various points of the apparatus where torque is to be applied at a deep sea location, whereby various torque—application points are centralized within said at least one panel (10) for applying a torque using a torquing tool.

2. A system according to claim 1, wherein the flexible torque-transmitting drive (13) is a non-twisting cable.

3. A system according to claim 1, wherein said apparatus operated by said torquing tool is underwater exploration equipment.

4. A system according to claim 3, wherein said torquing tool is a remotely-operated vehicle.

5. A system according to claim 1, wherein said releasable connector is a nut, preferably a hexagon nut.

6. A system according to claim 2, wherein said apparatus operated by said torquing tool is underwater.

* * * * *